United States Patent Office 2,784,240
Patented Mar. 5, 1957

2,784,240

CYCLOOCTATETRAENE DERIVATIVES

Arthur C. Cope, Belmont, Mass., and Marion Burg, Metuchen, N. J., assignors to Merck & Co., Inc., a corporation of New Jersey No Drawing. Application December 27, 1952, Serial No. 328,255

8 Claims. (Cl. 260—648)

This invention relates to new halogen substitution products of cycloöctatetraene and more particularly to the monochloro and monobromo derivatives thereof.

Cycloöctatetraene is a known compound. Reference to its production is reported by Willstatter et al., 44 Berichte 3442 (1911) and 46 Berichte 518 (1913).

Dihalides of cycloöctatetraene (addition products obtained from molar equivalents of the halogens and cycloöctatetraene) are also known, and their preparation has been described by W. Reppe et al. at 560 Ann. 50, 54 (1948). The dihalides that are known are not substitution products of cycloöctatetraene, but addition products. These dihalides are believed to have the following structure:

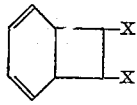

I

Where X is chlorine or bromine.

However, the monohalogen substitution products have not heretofore been produced and the present invention is concerned with their production. In accordance with the present invention, the monohalides are obtained from the dihalides by dehydrohalogenation. Under certain conditions the cycloöctatetraene dihalides of structure I above can be converted by this reaction to the monohalide having the following structure:

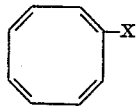

II

Where X is chlorine or bromine.

The compounds of the invention can be prepared by a dehydrohalogenation reaction between the dihalide and a base at low temperatures. Phenyllithium is a preferred agent, but other bases which will produce this same result are lithium diethylamide and lithium 2,6-dimethylpiperidide. Powdered potassium hydroxide converts the dichloride to the monohalide, although some β-chlorostyrene is also formed. In the reaction and in the subsequent removal of the solvent to obtain the relatively pure monohalide, the temperature should be kept as low as possible in order to avoid partial or complete isomerization to β-halostyrene. This is particularly true in the case of the bromo derivative, but the chlorocycloöctatetraene undergoes a similar thermal isomerization to β-chlorostyrene, but at a much higher temperature.

The compounds of the invention are useful as intermediates for the production of other derivatives of cycloöctatetraene as well as for the production of the β-halostyrenes.

Representative examples of the invention are the following:

Example I.—Chlorocycloöctatetraene

A solution of 0.111 mole of phenyllithium in 270 ml. of ether was prepared under nitrogen in a 500-ml. two-necked flask containing an outlet closed by a stopcock at the bottom. A solution of 17.5 g. (0.1 mole) of cycloöctatetraene dichloride in 100 ml. of dry ether was placed under nitrogen in a 500-ml. three-necked flask fitted with a mercury-sealed stirrer, a thermometer extending into the liquid, an outlet attached to a drying tube, and a connection to the bottom outlet of the flask containing phenyllithium. The solution of phenyllithium was added with stirring and cooling during a period of 45 minutes at a reaction temperature of —5 to —2°. During the addition the mixture became turbid and a color change from yellow to red to blue occurred.

The mixture was stirred for 3 hours with cooling after the addition was completed, and for 7 hours while the ice-salt bath warmed to room temperature.

There was on significant change in the yield of the monchloro derivative when the mixture was decomposed a few minutes after the addition of phenyllithium was completed. When the phenyllithium was added at —30 to —20° and the mixture was hydrolyzed after stirring for 1.5 hours at that temperature, the yield of monochlorocycloöctatetraene was reduced to 13%.

Cold water (100 ml.) was added, and the orange-yellow ether layer was washed with four 50-ml. portions of water. The water washings were extracted with 50 ml. of ether, the extract was washed twice with water, and the combined ethereal solutions were dried over magnesium sulfate. The ether was distilled through a packed column and the residue was fractionated through a semi-micro column of the kind described by C. W. Gould et al. at 20 Anal. Chem. 361 (1948).

The distillation separated a forerun (0.72 g.), 2.11 g. of higher boiling fractions (B. P. 92–104° at 0.65 mm.), probably containing the recovered dichloro compound, and 5.7 g. of a dark viscous residue from 3.66 g. (26%) chlorocycloöctatetrane, a yellow liquid having the structure:

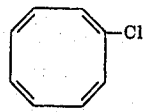

III

B. P. 51–50° (5.5 mm.), $n_D^{25}$ 1.5542, $d_4^{25}$ 1.1199; $M_D$ calcd. 39.94, found 39.70.

Anal.—Calcd. for $C_8H_7Cl$: C, 69.33; H, 5.09; Cl, 25.58. Found: C, 69.33; H, 5.37; Cl, 25.26.

Example II.—Bromocycloöctatetraene

Phenyllithium (270 ml. of an ethereal solution containing 0.078 mole) was added to a solution of 21 g. (0.078 mole) of cycloöctateraene dibromide in 100 ml. of dry ether under the conditions described in Example I. After the addition was complete, the mixture was allowed to stand at —3° for 1 hour, and the product was isolated in the same manner as in Example I. Ether and benzene were removed through a packed column under reduced pressure by warming in a bath at room temperature to 50°. The residue was distilled through a semi-micro column at a low pressure and temperature (to avoid thermal rearrangement); the condenser attached to the column was cooled with ice water, and the receiver also was cooled with ice water.

The distillation separated a fore-run (5.7 g.), B. P. up to 42° (1.3 mm.), which contained benzene, bromobenzene and a very small amount of cycloöctatetraene from 6.6 g. of the crude monobromo derivative, B. P. 38–42° (1.3 mm.), having the structure:

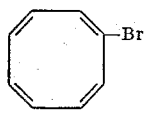

IV

A higher boiling fraction (3.4 g., B. P. 78–90° at 1.1 mm.) containing cyclooctatetraene dibromide also was collected, and the viscous residue amounted to 2.4 g. Two additional distillations of the crude monobromo derivative yielded 4.64 g. (33%) of bromocyclooctatetraene, an orange-yellow liquid, B. P. 52.5–53° (1.8 mm.), $n_D^{25}$ 1.5870, $d_4^{25}$ 1.4206; $M_D$ calcd. 42.84, found 43.26.

Anal.—Calcd. for $C_8H_7Br$: C, 52.49; H, 3.85; Br, 43.66. Found: C, 52.59; H, 3.81; Br, 43.33.

Example III

In subsequent larger scale preparations of bromocyclooctatetraene, the solvent was removed without warming by gradually reducing the pressure to 4 mm. After removal of the fore-run at 0.35 mm. the crude bromocyclooctatetraene was separated from the higher boiling portion by a rapid evaporative distillation at room temperature and 0.05 mm., the distillate being collected in a receiver cooled with Dry Ice and trichloroethylene. The bromocyclooctatetraene was purified by two slow evaporative distillations at room temperature through a 23 x 7.3-cm. water-jacketed Vigreux column after removal of a fore-run at a column temperature of 0–20°.

It is possible to use the chlorocyclooctatetraene of the invention as an intermediate to prepare cis-β-chlorostyrene by the following process:

Example IV

Chlorocyclooctatetraene (1.37 g., $n_D^{25}$ 1.5542) and a few milligrams of hydroquinone were heated under reflux in a nitrogen atmosphere for 2 hours in a bath at 200–210°. Distillation of the brown liquid through a semi-micro column yielded 1.25 g. of cis-β-chlorostyrene as a colorless liquid with a characteristic fragrant odor; B. P. 59° (3.5 mm.), $n_D^{25}$ 1.5762, $d_4^{25}$ 1.1046.

Anal.—Calcd. for $C_8H_7Cl$: C, 69.33; H, 5.09; Cl, 25.58. Found: C, 68.96; H, 5.06; Cl, 25.71.

From this cis-β-chlorostyrene, benzoic acid can be obtained by the following procedure:

Example V

Oxidation of 139 mg. of cis-β-chlorostyrene by heating under reflux for 1.5 hours with 2 ml. of 13% sulfuric acid containing 3 millimoles of chromic acid followed by isolation of the product by extraction with ether and sublimation yielded 52 mg. (41%) of benzoic acid, M. P. and mixed M. P. with a known sample 121–123°.

The cis-β-chlorostyrene can also be converted to the trans-β-chlorostyrene by the following procedure:

Example VI

Cis-β-chlorostyrene (150 mg., prepared according to Example IV) and 3 mg. of phosphorus pentachloride were heated in an atmosphere of nitrogen in a sealed tube for 2 hours at 220–235°. An ethereal solution of the product was washed with water until the washings were neutral, concentrated, and the residue was distilled twice through a semi-micro column. The product was analytically pure β-chlorostyrene, $n_D^{25}$ 1.5740, which according to the absorption bands 7.4μ, 11.65μ, 11.78μ, 12.95μ and 13.83μ was composed of cis and trans-β-chlorostyrene.

The bromocyclooctatetraene of the invention can be converted to β-bromostyrene by thermal rearrangement according to the following:

Example VII

Bromocyclooctatetraene (0.75 g.) and a few milligrams of hydroquinone were heated in a nitrogen atmosphere at 90–103° for 0.5 hour. Distillation of the resulting brown liquid separated a small amount of high-boiling residue from 0.63 g. of analytically pure β-bromostyrene, a very pale yellow liquid with a fragrant odor, B. P. 55–56° (0.65 mm.), $n_D^{25}$ 1.6055, $\lambda_{max}$ 258 mμ (ε=19,220). The properties of an authentic sample of β-bromostyrene ($n_D^{25}$ 1.6052) were identical within experimental error with the sample obtained by rearrangement of bromocyclooctatetraene; $\lambda_{max}$ 258 mμ (ε=18,050). The infrared spectra of the two samples of β-bromostyrene were essentially identical. Both samples contain minor impurities which were present in smaller amount in the product formed by isomerization of bromocyclooctatetraene.

The chlorocyclooctatetraene of the invention can be used as an intermediate for conversion to β-iodostyrene by the following procedure:

Example VIII

A solution of 1.38 g. of chlorocyclooctatetraene, 1.95 g. of sodium iodide and a few milligram of hydroquinone in 11 ml. of acetone was heated under reflux in an atmosphere of dry nitrogen for 24 hours. The sodium chloride which separated amounted to 0.547 g. (94%). The acetone solution was added to 225 ml. of water and the orange oil which separated was extracted with ether. The extracts were dried over magnesium sulfate, concentrated, and the residue was distilled twice through a semi-micro column, yielding 1.65 g. (72%) of analytically pure β-iodoestyrene, B. P. 74° (1 mm.), $n_D^{25}$ 1.6585. The ultraviolet absorption spectrum of the β-iodostyrene prepared by this route ($\lambda_{max}$ 266 mμ, ε=20,400) was essentially identical with the spectrum of an authentic sample ($\lambda_{max}$ 264 mμ, ε=19,900).

In Examples I and II, the cyclooctatetraene monohalide is obtained by the use of phenyllithium as the base, but other examples employing other bases which will bring about a dehydrohalogenation reaction are to be considered as included. For instance, the procedure of Examples I and II may be carried out using lithium diethylamide and lithium 2,6-dimethylpiperidine. Such bases as powdered potassium hydroxide may be used in Examples I and II, but as has been noted, appreciable amounts of β-chlorostyrene are also formed.

What is claimed is:

1. Monohalogen substitution products of cyclooctatetraene wherein the halogen is selected from the class consisting of chlorine and bromine.

2. The compound chlorocyclooctatetraene having the structure:

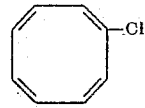

3. The compound bromocyclooctatetraene having the structure:

4. The process for producing monohalogen derivatives of cyclooctatetraene selected from the class consisting of chlorine and bromine, which consists in reacting the corresponding cyclooctatetraene dihalide with a base selected from the group consisting of phenyllithium, lithium diethylamide and lithium 2,6-dimethylpiperidine at a temperature between −30° to −2° C.

5. The process for producing monochlorocyclooctatetraene which consists in reacting cyclooctatetraene dichloride with a base selected from the group consisting of phenyllithium, lithium diethylamide and lithium 2,6-dimethylpiperidide at a temperature between —30° to —2° C.

6. The process for producing monobromocyclooctatetraene which consists in reacting cyclooctatetraene dibromide with a base selected from the group consisting of phenyllithium, lithium diethylamide and lithium 2,6-dimethylpiperidide at a temperature between —30° to —2° C.

7. The process for producing monochlorocyclooctatetraene which consists in reacting cyclooctatetraene dichloride with phenyllithium at a temperature between about —5° to —2° C.

8. The process for producing monobromocyclooctatetraene which consists in reacting cyclooctatetraene dibromide with phenyllithium at a temperature of about —3° C.

References Cited in the file of this patent
UNITED STATES PATENTS

| | | |
|---|---|---|
| 2,504,016 | Foster | Apr. 11, 1950 |
| 2,569,441 | Alquist et al. | Oct. 2, 1951 |
| 2,626,961 | Eberly et al. | Jan. 27, 1953 |

OTHER REFERENCES

Brown et al.: "Chemical Society Journal," 1944, pages 101–103.

Craig: "Chemical Reviews," pages 123–126 (1951).